US008825593B2

(12) United States Patent
Dodds et al.

(10) Patent No.: US 8,825,593 B2
(45) Date of Patent: Sep. 2, 2014

(54) SYSTEM FOR AGGREGATING DATA AND A METHOD FOR PROVIDING THE SAME

(75) Inventors: Matthew Dodds, Toronto (CA); Chacko Kattithara Paul, Toronto (CA)

(73) Assignee: Trapeze Software ULC, Toronto (CA)

( * ) Notice: Subject to any disclaimer, the term of this patent is extended or adjusted under 35 U.S.C. 154(b) by 25 days.

(21) Appl. No.: 12/748,143

(22) Filed: Mar. 26, 2010

(65) Prior Publication Data

US 2010/0250485 A1 Sep. 30, 2010

(30) Foreign Application Priority Data

Mar. 31, 2009 (CA) .................................... 2660748

(51) Int. Cl.
G06F 17/30 (2006.01)

(52) U.S. Cl.
USPC .......................................... 707/602; 705/7.26

(58) Field of Classification Search
USPC .................................... 707/101, 4, 10, 3, 102
See application file for complete search history.

(56) References Cited

U.S. PATENT DOCUMENTS

| | | | | |
|---|---|---|---|---|
| 6,035,298 A * | 3/2000 | McKearney | ............................ | 1/1 |
| 6,154,766 A * | 11/2000 | Yost et al. | ...................... | 709/201 |
| 6,480,842 B1 * | 11/2002 | Agassi et al. | ........................... | 1/1 |
| 7,039,654 B1 * | 5/2006 | Eder | ...................................... | 1/1 |
| 7,051,322 B2 * | 5/2006 | Rioux | ............................ | 717/143 |
| 7,143,112 B2 * | 11/2006 | Yagawa | ................................. | 1/1 |
| 7,181,734 B2 * | 2/2007 | Swamy et al. | ................. | 717/144 |
| 7,308,449 B2 * | 12/2007 | Fairweather | ........................... | 1/1 |
| 7,571,182 B1 * | 8/2009 | Eddy | ...................................... | 1/1 |
| 7,584,163 B2 * | 9/2009 | Altenhofen et al. | ............. | 706/47 |
| 7,627,466 B2 * | 12/2009 | Ramsey et al. | .................... | 704/9 |
| 7,805,462 B2 * | 9/2010 | Dupont et al. | ................. | 707/802 |
| 7,870,012 B2 * | 1/2011 | Katz et al. | ...................... | 705/7.26 |
| 2003/0018605 A1 * | 1/2003 | Policastro et al. | ................ | 707/1 |
| 2003/0074358 A1 * | 4/2003 | Sarbaz et al. | .................... | 707/10 |
| 2005/0027683 A1 * | 2/2005 | Dill et al. | ........................... | 707/2 |
| 2006/0112123 A1 * | 5/2006 | Clark et al. | ....................... | 707/101 |
| 2007/0027904 A1 * | 2/2007 | Chow et al. | ..................... | 707/102 |
| 2008/0016035 A1 * | 1/2008 | Middelfart | ......................... | 707/3 |
| 2008/0022107 A1 * | 1/2008 | Pickles et al. | .................. | 713/176 |
| 2008/0147704 A1 * | 6/2008 | Godwin et al. | ................ | 707/102 |
| 2008/0307386 A1 * | 12/2008 | Chen et al. | ....................... | 717/109 |
| 2009/0172000 A1 * | 7/2009 | Lavdas et al. | .................. | 707/101 |
| 2009/0240726 A1 * | 9/2009 | Carter et al. | .............. | 707/103 R |
| 2010/0121857 A1 * | 5/2010 | Elmore et al. | ................. | 707/748 |

* cited by examiner

Primary Examiner — James Trujillo
Assistant Examiner — Thong Vu
(74) Attorney, Agent, or Firm — McMillan LLP

(57) ABSTRACT

A system for aggregating data from a plurality of operational databases, and a method for providing the same, are provided. The system includes a data store storing a collection of pre-defined extraction scripts. The extraction scripts identify data available for extraction from a plurality of operational database products, and including parameters for specifying which of the data to extract. A data warehouse server executes the extraction scripts to extract, merge, transform and load the specified data from the plurality of operational databases into a multidimensional database.

30 Claims, 8 Drawing Sheets

```
<Request Version="1.0">                            ──── 304
  <Connections>
    <Connection ID="DataSource1" user="" password="" DSN="ClientDataSource"
DbdRefID="DataSource1Dbd" MaxThreads="12"/>
    <Connection ID="ConfigSource1" user="" password="" DSN="ClientConfigSource"
DbdRefID="ConfigSource1Dbd" MaxThreads="12"/>                              ── 308
    <Connection ID="DataVault" user="" password="" DSN="ViewPoint_DataVault"
DbdRefID="DataVaultObd" MaxThreads="12"/>
  </Connections>
  <Dbds>
    <Dbd ID="DataSource1Dbd">C:\Trapeze\MmsData.dbd</Dbd>
    <Dbd ID="ConfigSource1Dbd">C:\Trapeze\MmsCfg.dbd</Dbd>                  ── 312
    <Dbd ID="DataVaultDbd">..\Schemas\DataVaultTrapeze.db-schema</Dbd>
  </Dbds>
  <Stages>
    <Stage>
      <CommandFiles>
        <CommandFile ID="DataVault">..\Trapeze_V7_x\CommandFiles\FullProcess.xml   ── 316
          <Group Type="group" ID="DataGroup">
            <Item>Config</Item>
          </Group>
          <Input>
            <Variable ID="DBSource" datatype="string">ClientName_config</Variable>
          </Input>
          <ElementMaps>
            <ElementMap type="Connection" FromRefID="ConfigSource1" ToRefID="Source"/>
            <ElementMap type="Connection" FromRefID="DataVault" ToRefID="Vault"/>
            <ElementMap type="Dbd" FromRefID="ConfigSource1Dbd" ToRefID="Source"/>
          </ElementMaps>
        </CommandFile>
      </CommandFiles>
    </Stage>
    <Stage>
      <CommandFiles>
        <CommandFile ID="DataVault">..\Trapeze_V7_x\CommandFiles\FullProcess.xml
          <Group type="group" ID="DataGroup">
            <Item>COM</Item>
          </Group>
          <Input>
            <Variable ID=DBSource" datatype="string">ClientName</Variable>
          </Input>
          <ElementMaps>
            <ElementMap type="Connection" FromRefID="DataSource1" ToRefID="Source"/>
            <ElementMap type="Connection" FromRefID="DataVault" ToRefID="Vault"/>
            <ElementMap type="Dbd" FromRefID="DataSource1Dbd" ToRefID="Source"/>
          </ElementMaps>
        </CommandFile>
      </CommandFiles>
    </Stage>
  </Stages>
</Request>
```

SYSTEM FOR AGGREGATING DATA AND A METHOD FOR PROVIDING THE SAME

FIELD OF THE INVENTION

The present invention relates to the field of data aggregation and analysis. In particular, it relates to a system for aggregating data from a plurality of operational databases and a method for providing the same.

BACKGROUND OF THE INVENTION

One of the issues in any organization is the accumulation of data over time. As an organization develops, records are kept of all data that is deemed important to that organization. Personnel records, sales reports, and client lists are all examples of the myriad of types of data that organizations collect. The advent of computerized databases has greatly facilitated the recording and collecting of data. However, mere collection of data on its own is of little value. The greater value lies in the ability to review the data and subject it to further analysis for performance evaluation and future planning.

This is especially true in the case of operational databases. Operational databases are employed by operational systems to carry out regular operations of an organization that are often transaction-based. In order to better address the needs of a particular application, such databases are built on online transaction processing ("OLTP") models, wherein the efficiency of historical analysis of the data is sacrificed for operational agility.

Given increasing trends towards specialization, it is common for separate areas of an organization (departments, offices, etc.) to maintain their own databases. Thus, for example, a business may have a personnel database maintained by one department, a sales database maintained by another department, an accounting and/or payroll database maintained by a third department, and so forth. As each database is separately maintained, and has a separate purpose, interoperability and data exchange between the separate databases becomes more difficult, at least in part due to differences in data formats. Where at least some of these databases are operational, the challenges faced become greater.

At the upper levels of the business, there is a need for executives and managers to track performance metrics across the entire organization in order to make both short-term and long-term decisions. In order to track these metrics collectively, however, a system and method of integrating data from the multiple operational databases in the organization is needed.

One solution is the use of an extract, transform and load ("ETL") engine to extract the data from the individual operational databases, transform the extracted data into a unified data format, and load the transformed data into a single database for access. While the principles behind the ETL engine are relatively simple to understand, the implementation and execution of ETL engines have proven to be very complex. More often than not, such ETL engines are custom-designed, programmed and compiled to accommodate the individual operational databases and needs of a specific organization. This custom work is both time-consuming and costly, limiting adoption of present ETL engines as a solution. Similarly, when changes are made to the format(s) of any of the operational databases, the source code for the ETL engine must be revised to compensate for changes. Such changes typically require modifications directly to the programming code of the ETL engine, which can be time-consuming and costly, especially where the changes are being made by a party other than the original author/developer, hereinafter referred to as "the developer". As the organization size and the number of individual databases increase, this problem becomes more significant. Once the changes are made, the revised source code must be recompiled before it can be deployed.

There are a number of scenarios where it can be desirable for an organization to obtain access to the source code of such ETL engines. For example, the relationship between the developer of the ETL engine and the organization may sour, perhaps due to the inability of the developer to deliver modifications in a timely manner to the organization in response to changes to the operational databases. The developer may cease operations for any of a number of reasons. Such scenarios generally call for the use of a source code escrow as the developer may not wish to provide direct access to the source code unless the organization absolutely requires it. The use of such a source code escrow adds a layer of additional costs. Further, even if the source code is made available to the organization, they have to secure the services of another developer to customize the source code as required to address the changes to the operational databases maintained by their organization. As will be appreciated, these changes can prove difficult and costly.

It is therefore an object of the invention to provide a novel system and method for aggregating data.

SUMMARY OF THE INVENTION

In accordance with an aspect of the invention, there is provided a system for aggregating data from a plurality of operational databases, comprising:

a data store storing a collection of pre-defined extraction scripts identifying data available for extraction from a plurality of operational database products, said extraction scripts including parameters for specifying which of said data to extract; and a data warehouse server for executing said extraction scripts to extract, merge, transform and load said specified data from said plurality of operational databases into a multidimensional database.

The extraction scripts can identify fields and tables where the data is stored in the operational database products. The data store can further include an extraction management script identifying a subset of the extraction scripts for execution, the subset corresponding to the operational databases. The extraction management script can identify the subset of the extraction scripts using parameters. The extraction management script can include address information for identifying the location of the operational databases, and login credentials for connecting to the operational databases. The system can include a system configuration utility for providing an interface for modifying the extraction scripts and the extraction management script.

In accordance with another aspect of the invention, there is provided a method for providing a system for aggregating data from a plurality of operational databases via a data warehouse server, comprising:

providing a collection of pre-defined extraction scripts identifying data available for extraction from a plurality of operational database products, said extraction scripts including parameters for specifying which of said data to extract; and executing a subset of said extraction scripts to extract, merge, transform and load said specified data from said plurality of operational databases into a multidimensional database.

The method can include identifying, in the extraction scripts, where the data is stored in the operational database products. The method can also include providing an extraction management script identifying the subset of the extraction scripts for execution. The extraction management script can identify the subset of the extraction scripts using parameters. Additionally, the extraction management script can include address information for identifying the location of the operational databases. The extraction management script can include login credentials for connecting to the operational databases.

The method can further include providing an interface for modifying the extraction scripts and the extraction management script.

In accordance with a further aspect of the invention, there is provided a system for aggregating data from a plurality of operational databases, comprising:

a data store storing a collection of pre-defined scripts identifying configuration information for the system, the scripts including parameters for modifying the configuration information; and a data warehouse server for executing the scripts to extract, merge, transform and load data from the operational databases in accordance with the configuration information to generate a multidimensional database.

The configuration information can include extraction information identifying data to be extracted and its location in the operational databases, merge information specifying merges to be performed on the extracted data, transformation information specifying transformations to be performed on the extracted data, and loading information specifying how the transformed data is to be loaded. The scripts can include at least one extraction script specifying the extraction information, and at least one transformation script specifying the merge information, the transformation information and the loading information. The at least one extraction script can be XML-based. The merge information in the at least one transformation script can specify an order in which the data extracted from the operational databases is merged. The at least one transformation script can be an SSIS script.

The system can further include an extraction management script identifying a subset of the extraction scripts for execution. The extraction management script can include address information for identifying the location of the subset of the operational databases, and login credentials for connecting to the subset of the operational databases.

The system can further include a system configuration utility providing an interface for modifying the parameters in the scripts.

In accordance with yet another aspect of the invention, there is provided a method for aggregating data from a plurality of operational databases via a data warehouse server, comprising:

providing a collection of pre-defined scripts identifying configuration information for the system, the scripts including parameters for modifying the configuration information; and executing a subset of the scripts to extract, merge, transform and load data from the operational databases in accordance with the configuration information to generate a multidimensional database.

The configuration information can include extraction information identifying data to be extracted and its location, merge information specifying merges to be performed on the extracted data, transformation information specifying transformations to be performed on the extracted data, and loading information specifying how the transformation data is to be loaded. The providing can include providing at least one extraction script specifying the extraction information, and providing at least one transformation script specifying the transformation information. Additionally, the providing can include providing at least one extraction management script identifying a subset of the extraction scripts for execution.

The method can further include providing an interface for viewing and modifying the extraction, merge, transformation and loading information in the scripts.

Other and further advantages and features of the invention will be apparent to those skilled in the art from the following detailed description thereof, taken in conjunction with the accompanying drawings.

BRIEF DESCRIPTION OF THE DRAWINGS

The invention will now be described in more detail, by way of example only, with reference to the accompanying drawings, in which like numbers refer to like elements, wherein:

FIG. 2 is an exemplary extraction management script used in the system of FIG. 1;

DETAILED DESCRIPTION OF THE PREFERRED EMBODIMENT

Figure 1:
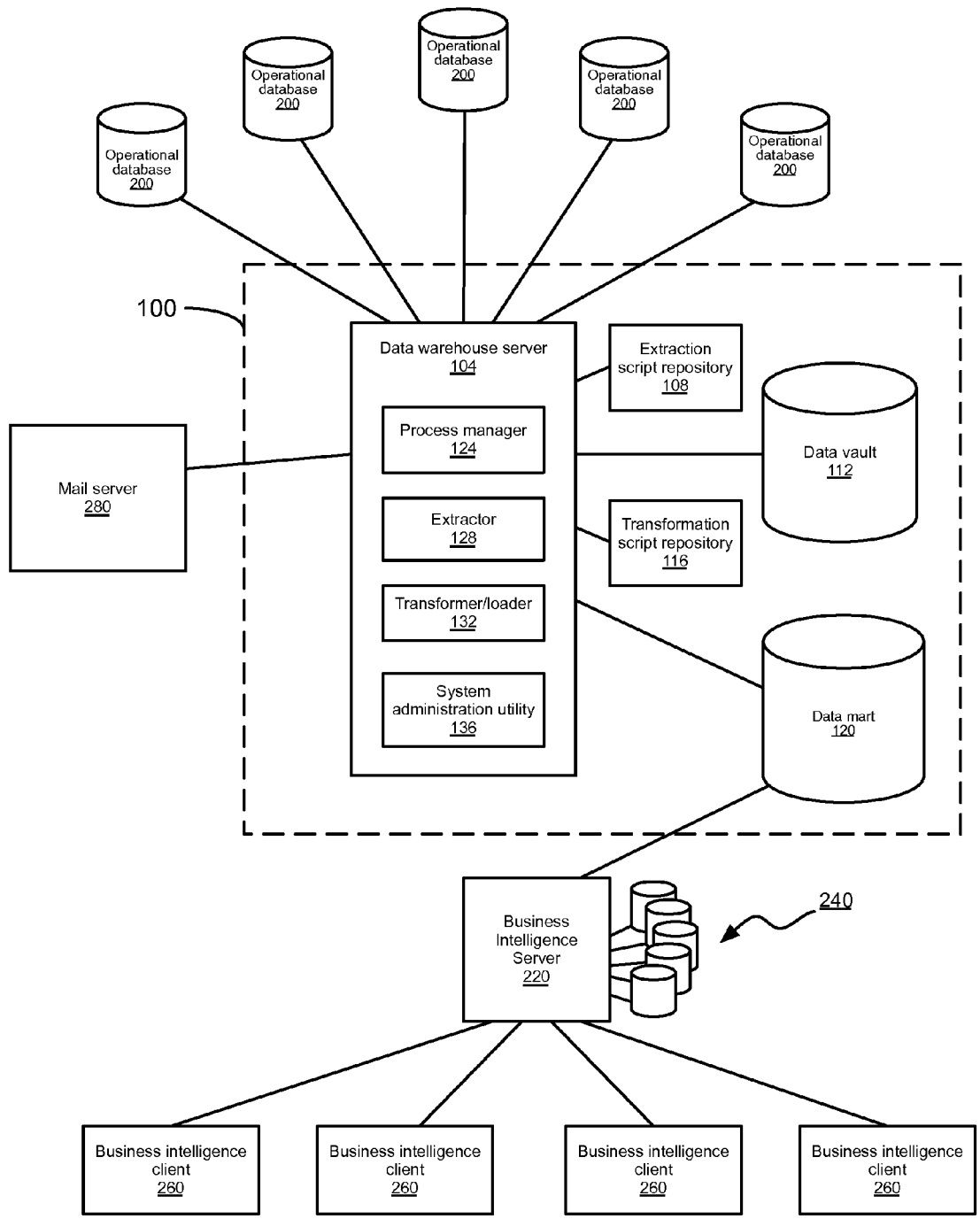
FIG. 1 is a block diagram of a data aggregation system and its operating environment in accordance with an embodiment of the present invention.

Many organizations will use a number of databases in day-to-day operations. In some cases, some of the databases are operational databases, and in other cases, all of the databases are operational databases. Hereinafter, the term "operational databases" shall refer to a collection of databases, at least some of which are operational databases. Further, the term "operational database" shall refer to any database in a set of operational databases.

For example, a public transit organization will have operational databases for vehicle routes and schedules, driver routes and schedules, maintenance, payroll, and customer requests, among others.

Generally, the operational databases used by various organizations are "canned" systems that are hereinafter referred to as "products". These products are purchased and customized to meet the needs of the individual organization, yet the underlying databases generally remain unchanged. That is, the tables and fields of the operational databases, and the relationships between them, remain unchanged during customization.

During the lifetime of such products, they can evolve to meet the changing needs of organizations. These evolutionary steps come in the form of versions of products. While these different versions may be variations of the same product, for ease of description, they will be treated as and referred to hereinafter as different products. As a result, once the "product" upon which an operational database has been determined, the particular data stored, its type and format, and its location are known.

These products can be built on different database management systems, such as Microsoft® SQL Server®, Oracle® 11g and Sybase® IQ.

The present invention provides a system for aggregating data from a plurality of operational databases, and a method for providing the same. The system includes a collection of pre-defined scripts that include configuration information for the system. Some of the scripts correspond to operational database products, and others correspond to operations to be performed on data extracted from the operational databases. The configuration information includes, among other things, text fields and parameters. The text fields identify the name, location and login credentials of various databases, table and field names, etc. The parameters specify whether certain fields and tables will be extracted from the operational databases, and which operations will be performed with the data once it is extracted. In order to configure the system to meet the needs of an organization, a subset of the pre-defined scripts corresponding to the operational database products from which data is to be extracted is selected, along with a subset of the pre-defined scripts corresponding to the operations to be performed on the extracted data, and text fields and parameters in the scripts are modified to customize the scripts.

As many changes, either software or structural, to the operational databases, to the data to be extracted from the operational databases, to the validation checks to be performed on the data, or to the structure of the aggregated data representing the final product, can be addressed by modifying the configuration information contained in the scripts, modifications can be more easily made and checked.

A system for aggregating data in accordance with an embodiment of the invention is shown generally at 100 in FIG. 1. The data aggregation system 100 is in communication with a plurality of operational databases 200 from which data is to be extracted. In order to facilitate the accessing of data stored in the operational databases 200, each operational database 200 includes a database schema file that describes, using a defined standard language, the data tables, the fields of each table and their formats, and the relationships between fields and tables. A business intelligence server 220 is coupled to the data aggregation system 100 for obtaining data that has been extracted from the operational databases 200, validated, cleaned and transformed by the data aggregation system 100. A number of business intelligence clients 240 are in communication with the business intelligence server 220. The business intelligence clients 240 provide a user-friendly interface for presenting various views of the aggregated data to enable business analysis to be performed.

The business intelligence server 220 queries the data aggregation system 100 and, in response, receives one or more OLAP cubes 260 that it uses to provide the various views of the data. The OLAP cubes 260 may be cached by the business intelligence server 220 to be used at a later time in response to a similar query.

A mail server 280 is coupled to the data aggregation system 100 for communicating messages to users of the data aggregation system 100.

The data aggregation system 100 includes a data warehouse server 104 that manages the overall process of data aggregation. The data warehouse server 104 has access to an extraction script repository 108 that is a virtual directory maintained locally by the data warehouse server 104. The extraction script repository 108 houses extraction scripts and an extraction management script that identifies extraction scripts to be executed. Each extraction script corresponds to an operational database product and includes a list of the tables and fields in the operational database product, along with parameters for specifying whether the tables and fields are to be extracted. A data vault 112 for storing data extracted from the operational databases 200 is coupled to the data warehouse server 104. The data vault 112 is a relatively flat database that provides a temporary repository for data extracted from the operational databases 200. Data extracted from the operational databases 200 is stored in its native format in order to reduce the processing required during the extraction of the data and, thus, the amount of time during which the operational databases are tied up. A history of all changes made to the data in the operational databases 200 is recorded in the data vault 112 in a transaction log. The data vault schema is stored in a db-schema file that is initially created and maintained manually with DBEdit.

The data warehouse server 104 also has access to a transformation script repository 116 that houses transformation scripts. The transformation scripts include merge information, transformation information and loading information. The merge information specifies merges to be performed on the data extracted from the operational databases 200 and stored in the data vault 112. The transformation information specifies transformations to be performed on the merged data. The loading information specifies how the merged and transformed data is to be loaded. In addition, the transformation scripts include validation information and cleaning information specifying validation checks and cleaning functions to be performed on the data respectively. Further, the transformation script repository 116 stores a data mart script that identifies the name, location and login credentials for the data mart 120. Like the extraction script repository 108, the transformation script repository 116 is a virtual directory maintained locally by the data warehouse server 104.

The data warehouse server 104 is also in communication with a data mart 120. The data mart 120 is a multidimensional database to which the data is loaded after merging, validation, cleaning and transformation.

The data warehouse server 104 has a number of software components for performing various functions, including a process manager 124, an extractor 128, a transformer/loader 132 and a system administration utility 136. The process manager 124 is a set of processes that manage and schedule the various functions performed by the extractor 128 and the transformer/loader 132. The extractor 128 is a set of executable programs for connecting to the operational databases 200 and extracting data specified by the extraction scripts in the extraction script repository 108. The transformer/loader 132 consists of structured query language ("SQL") server integration services ("SSIS") that execute the transformation scripts in the transformation script repository 116 to merge the data in the data vault 112 from the various operational databases 200, then validate, clean and transform the merged data prior to loading it into the data mart 120.

The system administration utility 136 provides a web interface for facilitating management of the data aggregation and for the selection and modification of the various scripts from the various pre-defined templates.

The operational databases 200, the data aggregation system 100, the business intelligence server 220, the business intelligence clients 240 and the mail server 280 all reside on a private network that is shared with various people in the organization. As it is desirable to restrict access to the data housed in the operational databases 200, the various databases are access-controlled. The data aggregation system 100 contains the appropriate credentials in order to authenticate with the operational databases 200, the data vault 112 and the data mart 120.

Scripts

The extraction script repository 108 initially contains a pre-defined extraction management script and a collection of pre-defined extraction scripts, each corresponding to a different operational database product. As the operational database products generally don't change during customization of the operational databases 200, the pre-defined extraction script corresponding to the operational database products can be customized via modification of text fields and parameters to address any customizations to the operational databases 200.

The extraction scripts are designed to direct the transfer of data from the operational databases to the data vault 112 using a specific version of a database schema file to the data vault 112. Commands in the extraction scripts are grouped together in many levels of product groups. This permits extraction scripts to isolate "products", or database management system ("DBMS") types, from each other and also provides support for various "staged" data loading strategies. Loading strategies may include: loading entire tables, loading data based on trigger updated log tables and loading data for only a certain number of days. The highest-level groups will be considered a combination of product and loading strategy to the system administration utility 136. The extraction scripts are organized based on the product line, the product, and then the version number of the software product used for the individual operational database.

As changes are made to any of the operational databases 200, or to the data extracted from them, as new operational databases 200 are added or removed, extraction scripts are modified or become inactive. When an extraction script is modified, a duplicate of the extraction script is created and renamed to identify it as a newer version. Similarly, when the extraction management script is modified, it is duplicated and renamed to identify it as a new version.

All the inactive, previously-employed extraction scripts are kept in the extraction script repository 108, so that no extraction script in the extraction script repository 108 is ever changed or deleted. In addition, all prior versions of the extraction management script referring to current and prior versions of the extraction scripts are kept in the extraction script repository 108. Thus, within the data aggregation system 100, for each individual operational database 200, there is a script history and archive of all the scripts used in the past to extract data from that particular operational database 200. Further, there is a complete history of all extraction configurations of the data aggregation system 100 via the combination of the entire set of extraction scripts and extraction management scripts.

FIG. 2 shows an exemplary extraction management script 300. The extraction management script 300 contains not only information for the operational databases 200, but also for the data vault 112. As shown, the extraction management script 300 includes version data 304 to identify its version.

A connections section 308 provides connection information for each database to be connected to. The connection information for each database includes an internal identifier for the database, login credentials consisting of a username and password, the database source name ("DSN") for the database, and the database schema identifier. A database definition file section 312 identifies the location of the database definition files for each database. A staging section 316 specifies extraction scripts to be executed to extract data from the operational databases 200.

Figure 3:
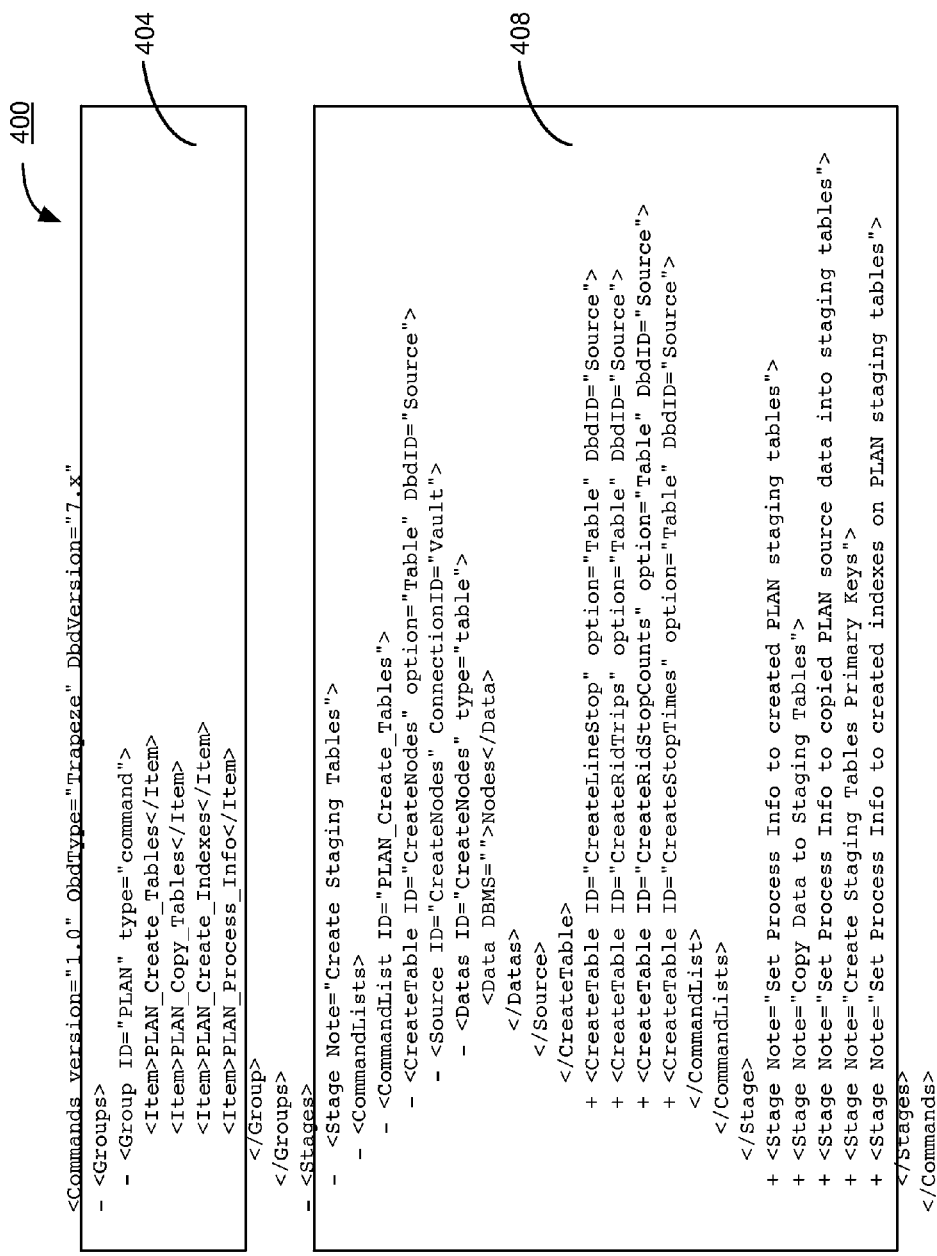
FIG. 3 is an exemplary extraction script used in the system of FIG. 1.

FIG. 3 shows an exemplary extraction script 400 that is called by the extraction management script of FIG. 2. Each extraction script 400 is associated with a particular operational database 200 and provides instructions to extract specified data from the operational database 200, create data structures (i.e., tables and fields) in the data vault 112 for storing the specified data if they don't exist, and store the extracted data in the data structures in the data vault 112. As shown, the extraction management script 400 has a routines section 404 and a subroutines section 408. The routines section 404 specifies the general routines to be performed to extract the desired data from a particular operational database 200. The subroutines section 408 defines the subroutines that ensure that the appropriate tables and fields are present or created in the data vault 112, and to actually extract specific data from tables/fields in the operational database 200 to the tables and fields in the data vault 112.

The transformation script repository 116 houses the transformation scripts that are used to merge the data from separate tables in the data vault 112 into tables of the data mart 120, then validate, clean and transform the merged data to generate a multidimensional database. The transformation scripts are SSIS scripts that are called and executed by the transformer/loader 132 on the data warehouse server 104, and use SSIS script packages to perform these tasks.

Figure 4:
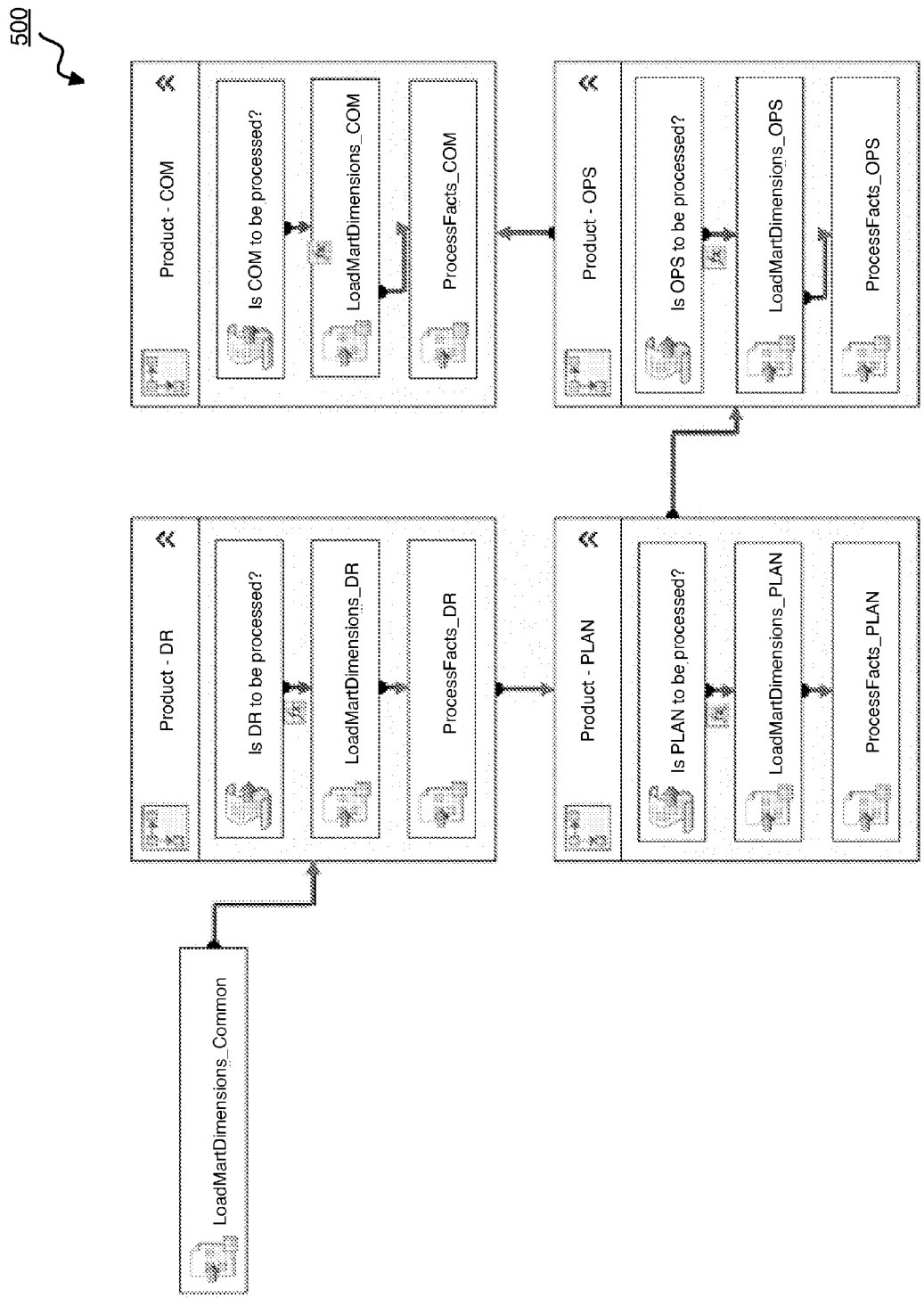
FIG. 4 is an exemplary transformation script used in the system of FIG. 1.

FIG. 4 shows an exemplary transformation script 500. The transformation script is an SSIS script as viewed through Microsoft® Visual Studio®. As shown, the transformation script 500 specifies the various functions to be performed on the data from each operational database 200 that is stored in the data vault 112. These functions include the merging of data from the data vault 112, the validation and cleaning of the merged data, the transformation of the validated data and the loading of the transformed data to the data mart 120. As will be appreciated, the transformation script 500 is very visual, thus facilitating its modification.

The transformation script 500 specifies that the data from the data vault 112 representing the data from the various operational databases 200 is imported serially when required, so that care can be taken to match up like data from one operational database 200 with the data previously merged from other operational databases 200. Additionally, the transformation script 500 specifies a sequence for the validation and cleaning that is performed on the data. Further, the transformation script 500 specifies the transformation(s) to be performed on the merged, validated and cleaned data, and the operations required to load the transformed data into the data mart 120.

Referring back to FIG. 1, the data mart 120 has an associated data mart schema, which describes the layout of the multidimensional database. Dimension data is contained in dimension, hierarchy and properties tables, while facts are stored in a single fact table per cube. The data mart schema is created manually using DBEdit. New fact tables and changes to dimension hierarchy or properties will not require changes to the data mart, whereas changes to fact tables may require a change in the coding of the data aggregation system 100.

Configuration of the Data Aggregation System

The system administration utility 136 provides a web interface for managing configuration of the data aggregation system 100. The system administration utility 136 facilitates specifying the name and location of the operational databases 200, the login credentials required, the location of the data in the operational databases 200 (i.e., table and field name), the version of the script, and what rules and categories will be used and how they are defined. In this manner, the system administration utility 136 enables modification of the extraction management script, the extraction scripts and the transformation scripts. The system administration utility 136 has a configuration file that stores default parameter values, parameter descriptions, value descriptions and layout options, and allows an authorized user to update the configuration file values, which would allow for custom setups and language translation. The system administration utility 136 permits the execution of any extraction script and can direct the transformer/loader 132 to execute any transformation script. The system administration utility 136 also handles common third-party data integration issues.

The system administration utility 136 presents a list of products to the user for selection. This list of available products is obtained by the system administration utility 136 from the scripts in the product directory. Each script has a list of groups that contain the commands that are a part of the group. The highest-level groups are the product groups. The system administration utility 136 obtains a unique list of these product groups, and presents it to the user for selection.

Figure 5:
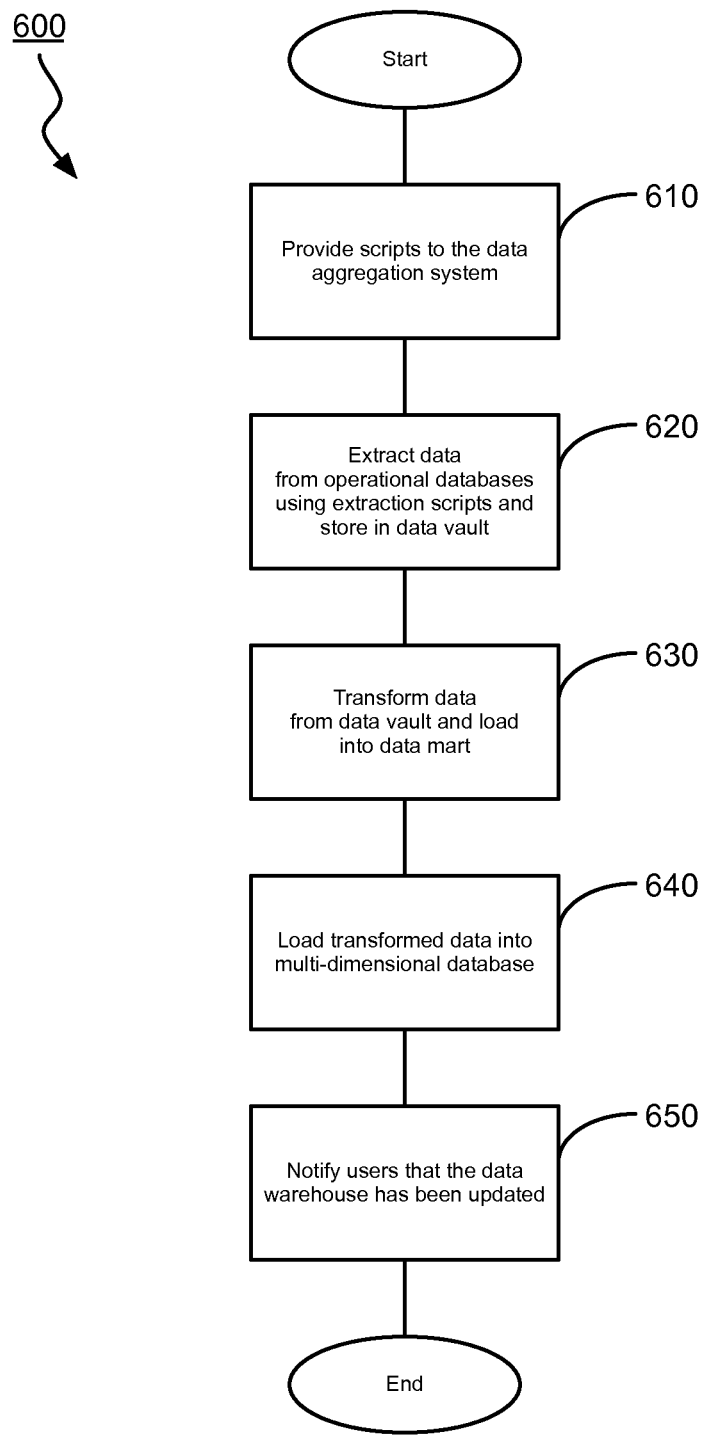
FIG. 5 is a flowchart of the configuration of the data aggregation system of FIG. 1.

FIG. 5 shows the general method of configuring the data aggregation system 100 via customization of the scripts generally at 600. A set of extraction scripts for the operational databases 200 is customized and stored in the extraction script repository (step 610). There is a one-to-one relationship between the extraction scripts in the extraction script repository 108 and current and past versions of the operational databases 200. The extraction scripts are extensible markup language ("XML") files that are easily read and modified, and provide details regarding the operational database 200 with which they are associated, including the names of tables/fields desired to be extracted, and the version number.

In order to extract data stored in an operational database 200, the extraction script corresponding to the operational database product upon which the operational database is based may need to be modified. In this case, a user interacts with the system administration utility 136 to effect this change. The system administration utility 136 copies the predefined extraction script for the operational database product upon which the particular operational database 200 is based (or an existing extraction script if the operational database has already been added to the data aggregation system 100) and renames it accordingly to identify it as the latest version. Then, the system administration utility 136 provides an interface through which the extraction information contained in the extraction script can be easily modified. Primarily, this is achieved through modification of the text fields and parameters in the extraction script. If, instead, an operational database 200 is removed from service or if data is no longer required from the operational database 200, no extraction scripts are added or deleted from the script database 140.

An extraction management script is generated and stored in the extraction script repository (step 620). The extraction management script is also an XML file that has a version number and references a list of all the extraction scripts used in conjunction with that version. When changes are made to the extraction scripts or to the address or login credentials of the operational databases 200, the system administration utility 136 copies the current extraction management script and renames it to identify it as the latest version of the extraction management script.

In order to move the operational data for each product out of the operational databases 200 and into the data vault 112, the system administration utility 136 obtains the information required to connect to each operational database 200. For this purpose, the following information is required for each source operational database 200: the database source name ("DSN"), the username and corresponding password, the schema version (product version), and the database definition file ("DBD"). The new operational databases 200 list available DSNs on the server, as well they list available product versions that come from the dbd type and dbd versions information in the scripts. The system administration utility 136 receives this information from the user and registers it in the extraction management script.

For example, when an operational database 200 is added to the data aggregation system 100, the name, location and login credentials are provided by a user via the system administration utility 136 and saved in the extraction management script. If an operational database 200 is removed from the data aggregation system 100, a parameter can be modified to indicate that the corresponding script does not need to be executed or, alternatively, the information for the operational database 200 can be removed from the extraction management script altogether.

The system administration utility 136 also obtains the address and login credentials for the data vault 112 and the data mart 120. In order to move data out of the operational databases and into the data aggregation system 100, an administrator must know where the data vault 112 is located. The following information is required for the data vault 112: the DSN, the username and the corresponding password. The system administration utility 136 prompts the user in a similar manner as when collecting connection information for the operational databases 200 and stores the information in the extraction management script.

Transformation scripts are generated and stored in the transformation script repository (step 630). When a user indicates via the system administration utility 136 that changes have been made to the data, requiring modifications to the merge functions, or the steps taken to validate, clean, transform or load the data, the system administration utility 136 makes a copy of the appropriate transformation scripts and modifies them to address the required changes.

As will be appreciated by those skilled in the art, the collection of all current and prior versions of the extraction management scripts, extraction scripts and transformation scripts enables a return of the data aggregation system 100 to any previous state in order to perform forensic analysis.

Operation of the Data Aggregation System

Figure 6:
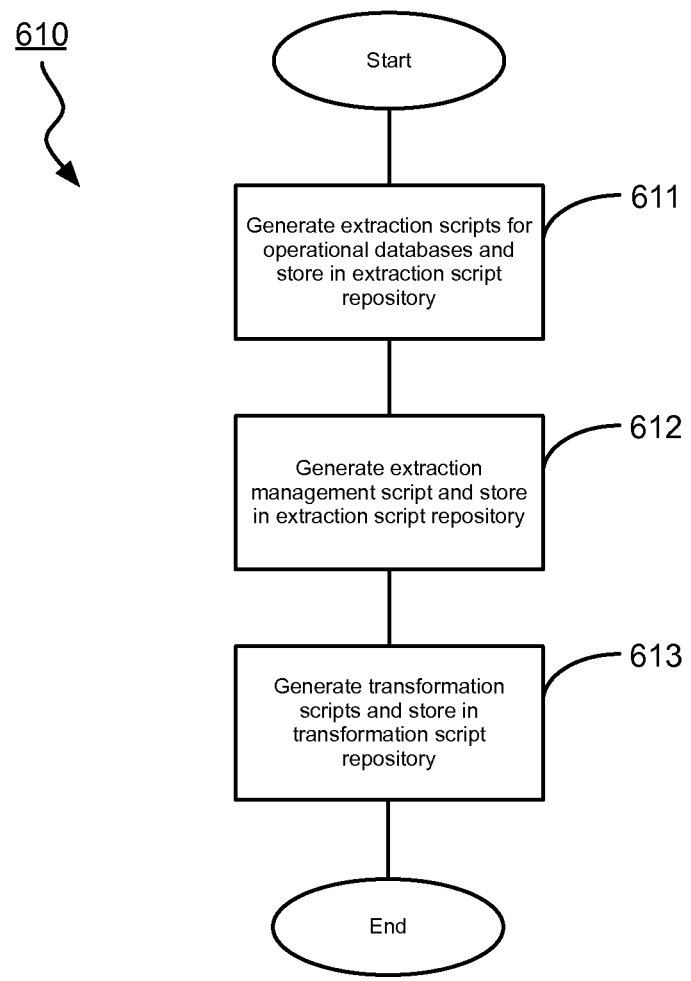
FIG. 6 is a flowchart of the general method of operation of the data aggregation system of FIG. 1.

Operation of the data aggregation system 100 will now be described with reference to FIGS. 1 and 6. In particular, FIG. 6 shows the method of aggregating data using the data aggregation system 100 generally at 700.

Data Extraction

Once the extraction script repository 108 has been populated with the appropriate extraction scripts, data can be extracted from the operational databases 200 using the extraction scripts and extraction management script and stored in the data vault 112 (step 710).

Figure 7:
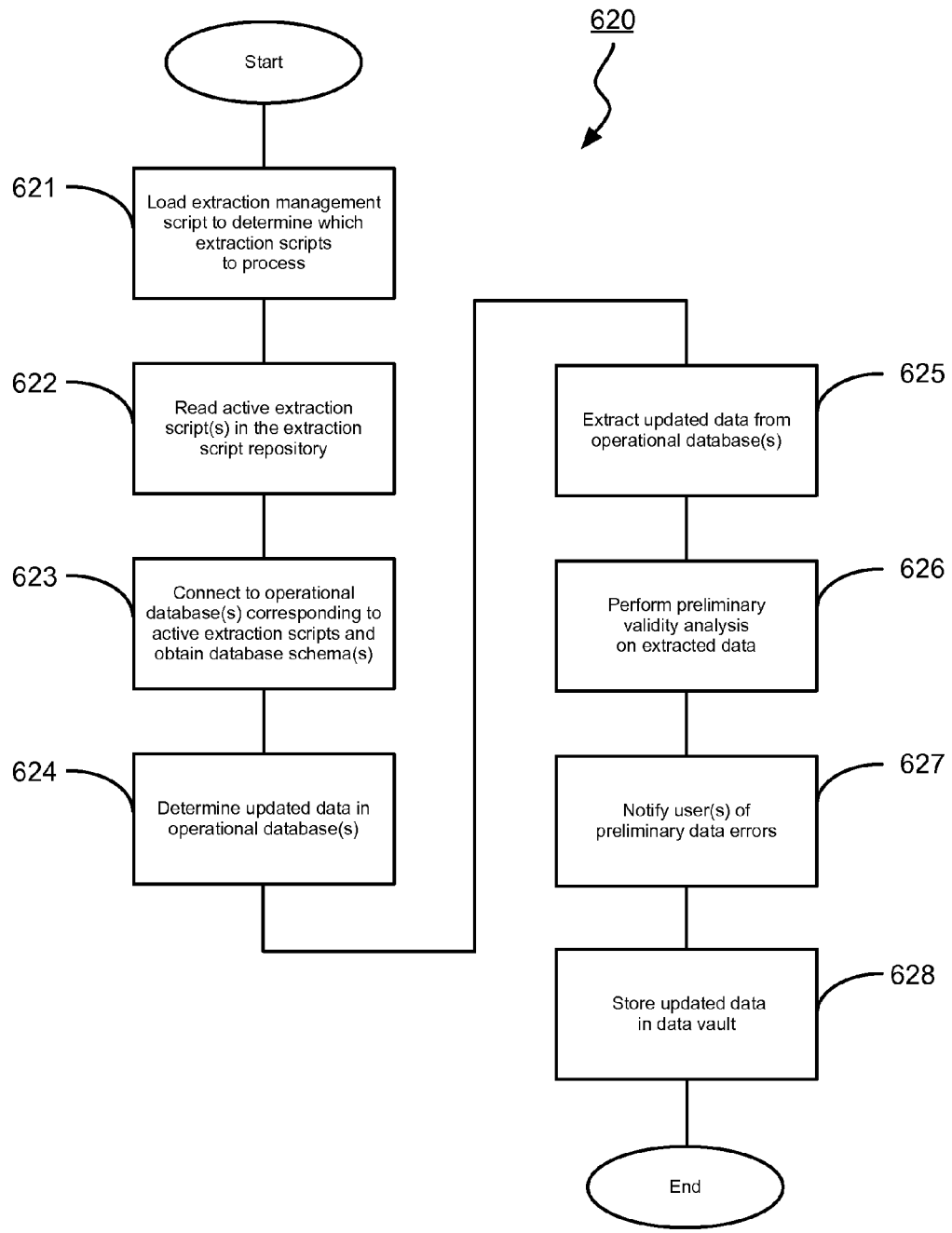
FIG. 7 is a flowchart showing in greater detail the data extraction of the method of FIG. 6.

FIG. 7 better details the extraction and storage of data during step 710. The process manager 124 triggers the extraction, merging, transforming and loading process either according to a schedule set through the system administration utility 136 or in response to a manual trigger received by the system administration utility 136. The first task that the process manager 124 performs is the running of the executable files of the extractor 128. The extractor 128 first loads the extraction management script to determine which extraction scripts are to be processed for updates (step 711).

The extractor 128 then reads the extraction scripts in the extraction script repository 108 identified in the extraction management script (step 712). Each extraction script indicates what tables/fields are to be extracted from the corresponding operational database 200.

Using the address, knowledge of the DBMS and the login credentials provided in the extraction management script, the extractor 128 then initiates communications with each of the operational databases 200 identified to obtain a copy of the database schema for each operational database 200 (step 713). As previously indicated, the database schema provides the data tables in the database, the fields of each table and their formats, and the relationships between the fields and tables.

The extractor 128 then determines the updated data identified in the extraction scripts in the operational databases 200 (step 714). The operational databases 200 provide a list of any data identified in the extraction scripts that has changed since the last extraction. If the data is being extracted for the first time from an operational database 200, then all of the data identified in the extraction script is extracted. Where changes have been made to one or more operational databases 200, or where one or more operational databases 200 have been added, the changes are identified by comparing the extraction scripts to the layout of the data in the operational databases 200, as provided by the database schemas retrieved from the operational databases 200. The appropriate hubs, links and satellite tables are added to the data structures in the data vault 112. Once a field is added to a table in the data vault 112, it is never removed.

The extractor 128 then uses the information contained in the extraction management script and the extraction scripts in conjunction with the information in the various database schema to extract the updated data from the operational databases (step 715).

A preliminary validity analysis is performed by the extractor 128 on the data being extracted from the operational databases 200 (step 716). During extraction, if a failure to recognize the data being extracted, or some other extraction error, occurs, the data extraction is stopped for that individual operational database and the error is logged.

The extracted data is then stored in the data vault 112 (step 717). The extracted data is stored by the extractor 128 in its native format in a relatively large flat database. By reducing the amount of data formatting, validation and transformation at this stage, the extractor 128 is able to interact quickly with the operational databases 200 to extract the data. In this manner, the time period during which the performance of the operational databases 200 is impacted is reduced in length. Once the identified data is extracted from each operational database 200, the extractor 128 disconnects from the operational database 200 in order to allow the operational database 200 to return to full operational agility.

Then, the extractor 128 notifies selected users of the errors detected in the extracted data (step 718). Users and/or groups of users who are selected to receive these notifications are identified via the system administration utility 136. The notifications are provided to the selected users via email sent by the data extractor 110 via the mail server 280 and indicate that the errors are viewable through the system administration utility 136. Then, the log can be reviewed using the system administration utility 136 to determine if the error arose during the extraction, suggesting that the extraction script for that operational database 200 needs to be updated, or from the database side, which can suggest corruption of the operational database 200.

Data Transformation and Validation

Turning back again to FIG. 6, once the data extraction is complete, the data from the various operational databases 200 in the data vault 112 is merged, validated and transformed in the data mart 120 (step 720). After the extractor 128 completes the data extraction, the process manager 124 directs the transformer/loader 132 to commence the process of merging, validating, cleaning and transforming the data commences. As the data vault 112 is separate and removed from the operational databases 200, any operations performed on it do not hinder their performance.

Using the information contained in the transformation scripts, the transformer/loader 132 maps each field and table in the extracted data and converts the data to a corresponding field and table in the data format of the data mart 120. In some cases, fields and tables may be combined, duplicated or created as necessary to comply with the data format used in the data mart 120.

Figure 8:
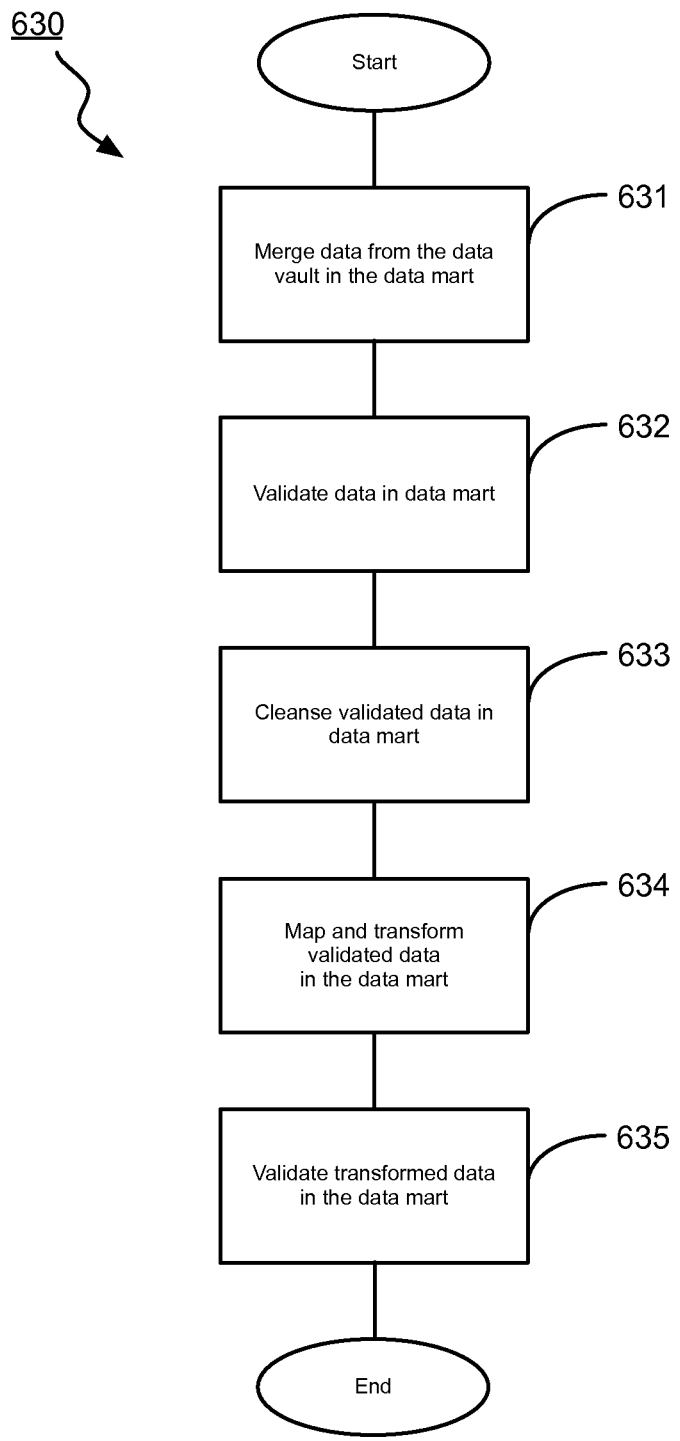
FIG. 8 is a flowchart showing in greater detail the merging, validating, cleaning and transforming of data of the method of FIG. 6.

FIG. 8 shows the steps performed by the transformer/loader 132 during merging, validation, cleaning and transformation of the data. The data transformation process also requires a robust data validation and data cleansing process to ensure that the transformed data corresponds to the original data.

The transformer/loader 132 merges the data from the data vault 112 (step 721). Upon initialization, the transformer/loader 132 reads the transformation scripts in the transformation script repository 116. The transformation scripts specify an order in which the data from the various tables/fields in the data vault 112 is to be imported and merged. The transformer/loader 132 proceeds with the importation and merging of data from the data vault 112 in the memory of the data warehouse server 104.

As the transformer/loader 132 is importing the data, it validates the data, both to capture exceptions (e.g. missing or null values) and obvious data errors (step 722).

Data that appears on its face to be valid is merged by the transformer/loader 132. Likewise, data that fails validation is also maintained separately and held for review to permit determination of the cause and nature of the error, and to enable correction, where possible.

When a transformation script gets the updated data from the data vault 112, it will use those records to get all records for the data mart table context; that is, if a fact table had a record for metric by each line and the data vault 112 had a change on one trip on that line, the transformation script will retrieve all trips on that line in order to reproduce the record in the fact table. The fact table would be updated if the current value has changed and inserted into the fact table if there is no value presently.

The transformation scripts determine if removed records have been archived or deleted based on whether all data for the archiving context has been removed. That is, if an entire day's schedule has been removed, then the script will treat this as archiving, otherwise it will consider it a change and reprocess that data mart context.

The transformation scripts use parameters to determine data categories such as no show codes or overtime pay codes, and use parameters to determine which of many alternate rules to apply in determining each number (i.e. whether or not break time is part of service time). Parameters are defined in the scripts and are unique to a product and section. A section is a subset of parameters that are related and are usually used in a single script.

Ultimately, the parameters are read by the transformer/loader 132, which in turn updates the database with values based on the parameters. The scripts then read the values from the database and use them to control the flow and calculations in the script.

Once the data is merged in the memory of the data warehouse server 104, the transformer/loader 132 cleanses the validated data to correct semantic errors (step 723). For example, an entry such as 'MAle' for the gender of a person could be changed to 'Male'.

Once the data has been validated and cleansed, the transformer/loader 132 performs the actual transformation of the validated data by mapping the fields and values to those defined for the multidimensional database of the data mart 120 (step 724). The transformations are defined in the transformation scripts. Data transformation applies to both fields and values. For example, one individual database may use the field "Gender" and the values "Male" and "Female", while another individual database uses the field "Sex" and the values "M" and "F". The transformation process needs to convert the fields and values from both individual databases into the same common format, as determine by the multi-dimensional database. The data failing validation at step 722 is also transformed into a separate area of the multidimensional database for later review.

After the data has been transformed into a unified format, the transformer/loader 132 reviews and validates the data to verify the integrity of the data and check for any errors that may have arisen (step 725). Data that fails validation is held for further review in the separate area of the multidimensional database, and either rejected or further reviewed and validated or rejected. As part of the further review process, required changes to the various scripts may be identified via the system administration utility 136 and made to address the issues that resulted in the initial failed validation and/or final rejection of the extracted and transformed data.

Data Loading and Storage

Turning back to FIG. 6, once the data has been transformed, it is then loaded into the multidimensional database in the data mart 120 for access by the business intelligence server 220 (step 730). The transformer/loader 132 loads both the validated and unvalidated data into the data mart 120 according to loading information in the transformation scripts.

The OLAP cube 220 is the end product of the data aggregation process, and contains all the aggregated data from the individual operational databases 200 (after validation and transformation, as described above) in a unified format. The OLAP cube 220 can then be accessed by users via business intelligence applications 220 to review the data and to run data analysis metrics on any desired portion of the aggregated data.

Once the final data validation is performed on the data, the data warehouse server 104 notifies selected users that the OLAP cube 220 has been updated (step 740).

Data Analysis

Review and analysis of the data in the data mart 120 is provided through the business intelligence clients 260. The business intelligence clients 260 enable users to query the business intelligence server 220 through a private network, or through a public network, such as the Internet. In response, the business intelligence server 220 queries the data mart 120 to obtain OLAP cubes 240 that serve as responses to the queries. Accordingly, security and access restriction mechanisms are provided to prevent unauthorized access to the data in the data mart 120. The business intelligence clients 220 contain tools needed for a user to run data analysis metrics on any combination of data available to the business intelligence server 220 in the data mart 120.

An OLAP cube is a data structure that allows fast analysis of data. The arrangement of data into OLAP cubes overcomes a shortfall of relational databases, in that they are not well-suited for near instantaneous analysis and display of large amounts of data. Instead, relational databases are better suited for creating records from a series of transactions known as on-line transaction processing ("OLTP"). Although many report-writing tools exist for relational databases, these are slow when the whole database must be summarized. OLAP cubes can be thought of as extensions to the two-dimensional array of a spreadsheet. For example a company might wish to analyze some financial data by product, by time-period, by city, by type of revenue and cost, and by comparing actual data with a budget. These additional methods of analyzing the data are known as dimensions. Because there can be more than three dimensions in an OLAP system, the term "hypercube" is sometimes used.

Example Application—Public Transit Organization

As an example of the present inventive system and method, a public transit organization is considered herein. Transit organizations contain multiple operational databases, including route schedules, driver schedules, vehicle maintenance orders and records, payroll and other human resources databases, and a variety of customer requests and customer feedback information. These operational databases are generally located in separate departments of the transit organization, and often in separate physical locations.

At the top organizational levels, there is a need for executives and managers to track performance metrics across the entire organization in order to make decisions for both short-term and long-term performance. Additionally, at lower levels, users require access to data to perform their assigned tasks as part of the organization's operations. The present data aggregation system and method facilitates the generation of an aggregate database containing the aggregated data from all of the individual operational databases in the organization.

To begin, extraction scripts are prepared via the system administration utility 136 for each of the transit organization's operational databases to be aggregated. The data aggregation system 100 provides pre-defined extraction scripts to facilitate configuration, reducing the time required to prepare the necessary extraction scripts for the individual operational databases. Likewise, the system administration utility 136 is used to generate the extraction management script and the transformation scripts.

The data aggregation system then runs the initial extraction for the individual operational databases to populate the data mart 120 as described above. This process may take considerable time on the first run, as the full contents of each individual operational database are processed. Accordingly, it can be desirable to schedule this initial extraction during a period of low use. Later runs can be restricted to updated or changed data only in order to minimize the time required for the extraction process.

With the data aggregation process completed, the contents of the individual operational databases are now contained in a unified data format in a single multidimensional database stored in the data mart 120. Users can then access the data stored in the data mart 120 via the business intelligence clients 260 and the business intelligence server 220 to map data and run performance metrics on different combinations of data as required by their assigned task and organizational needs.

As an example, when reviewing Paratransit (transit on-demand) performance, a category such as "On-Time Performance" can be presented generally, or on a per-route basis. Similarly, another category is "Ridership", again, presented as a total, or on a per-route basis. However, with both sets of data brought from their individual operational databases 200 into the data mart 120, on-time performance and ridership can be mapped together, collectively and on a per-route basis, and performance trends more accurately assessed. For example, the combined mapped data may generally show increased ridership with better on-time performance, but also that a decrease in on-time performance occurs as ridership increases beyond a certain point. This point, once identified, can then be used as the mark to increase the allocation of vehicles and routes to continue to sustain the level of on-time performance.

As another example, consider if the maintenance records for the organization show that the number of buses being pulled out of service is increasing. By taking advantage of the data mart 120, a series of metrics can be run to assist in identifying the source of the problem. Vehicle maintenance records can be mapped against operational routes to determine if certain routes lead to vehicles requiring more maintenance. Similarly, maintenance records can be mapped against driver records to determine if some drivers require more maintenance on their vehicles than others. Additionally, the driver route allocation can be mapped against the other results to look for a deeper underlying cause. By running these sets of metrics, the source of the maintenance problem can be readily identified, whether it is a route issue, a driver issue, or a maintenance/parts issue. The issue may even be a combination of these factors that is only apparent when the metrics are combined, such as a particular driver/route combination, and not identifiable from the individual operational databases 200 (maintenance, routes, driver scheduling) alone. Significantly, these metrics can be performed by any person with sufficient access levels to the multi-dimensional database, allowing for more rapid and more specific identification of issues and problems, ideally leading to faster solutions.

Another benefit for the transit organization, particularly an organization like a public transit organization where systems and users are continually being added, removed, and modified over time, is that new systems and users can be easily integrated into the system. Adding data from an additional operational database 200 to the data mart 120 is accomplished by adding the additional extraction script needed for the new operational database 200, modifying the extraction management script to reflect the new extraction script and modifying the transformation scripts to identify how the data from the new operational database 200 is to be combined with the other data, validated, etc. Adding new users to the data aggregation system 100 is a matter of providing the users permission to access the system administration utility 136. Thus, the overall data aggregation system is readily expandable to meet the needs of the transit organization. This is of particular use for those organizations which are also involved in purchases and mergers, as integration of new users and new operational databases 200 arising from the process is readily performed for minimal expenses and effort. Furthermore, if both parties were previously using the data aggregation system 100, integration can be even more rapidly achieved by an exchange of script repositories, enabling the data aggregation system 100 to access the new operational databases 200 with a minimal amount of time and labor.

A potential use for the data aggregation system 100 is in cooperation and coordination between different organizations. While different cities generally operate under different transit organizations, it is also common for individual cities to have multiple transit organization operating in the city, under different transit operations and/or different regional authorities. While it is recognized that cooperation and coordination between different authorities may not be common, the ability to exchange and compare equivalent data using the present invention makes such cooperation and coordination easier to achieve and may result in it becoming more common, to the benefit of both parties.

For example, in a city with different regional transit organizations operating under different regional authorities, cooperation between the regional authorities is facilitated, as data from the each authority's data mart 120, in accordance with the present invention, is in the same format, thus producing performance metrics which are compatible. The parties are then able to readily comprehend each other's metrics, allowing for greater understanding and improved coordination, without the need for the parties to be operating compatible systems at the individual database level, which may not be possible or desirable.

While the above system and method has been presented in the context of a public transit organization, the system and method are equally applicable to any business or organization which incorporates multiple operational databases and requires business intelligence on the aggregated data from all of the operational databases.

The data warehouse server can be a single physical computer or, alternatively, can be two or more computers, either in the same location or situated at remote locations. Correspondingly, the various functions performed by the data warehouse server can be handled by two or more computers.

The data vault, the data mart, and the two script repositories can be maintained locally on the data warehouse server or can be situated on separate computers.

While the invention was described with specificity to XML and SSIS scripts, those skilled in the art will appreciate that a number of other scripting languages can be substituted.

While the functionality provided by the various scripts is divided among three different script types, the same functionality can be provided by a single script, or by a different number of scripts.

Other methods of viewing and modifying the scripts will occur to those skilled in the art.

The individual operational databases can be located on the same server, different servers in the same location, or multiple servers across multiple locations. The physical location of the individual operational databases is not essential to the operation of the present invention. As long as the data aggregation system can access the individual operational databases, the data aggregation operation can proceed. Similarly, the communication between the data aggregation system and the individual operational databases can be wired or wireless, and can pass through proxies (e.g. Internet access), if necessary. Again, as long as communication can take place, the method used is not essential, although some methods can be preferred over others in context, in response to communication speed and bandwidth restrictions.

For some database software products, all the databases in a given product line are organized the same way. In such instances, the data aggregation system may be configured to use a single script for an entire product line.

The OLAP cubes presently used are star schema databases. Other database formats, however, can be implemented based on the nature of the organization and the content and access required for the OLAP cubes. However, star schema data cubes are preferred to enable compatibility with currently known analysis and interface tools, such as Microsoft Excel and ProClarity.

This concludes the description of a presently preferred embodiment of the invention. The foregoing description has been presented for the purpose of illustration and is not intended to be exhaustive or to limit the invention to the precise form disclosed. It is intended the scope of the invention be limited not by this description but by the claims that follow.

What is claimed is:

1. A system for aggregating data from a plurality of operational databases, comprising:
    a data store storing a collection of pre-defined extraction scripts, each of said pre-defined extraction scripts identifying data available for extraction from a separate one of a plurality of operational database products, said extraction scripts including parameters for specifying which of said data to extract; and
    a data warehouse server coupled to a set of operational databases corresponding to a first subset of said operational database products, said data warehouse server retrieving a database schema from each of the operational databases in the first subset of operational database products and, if the pre-defined extraction scripts and the database schemas are the same, executing a second subset of said pre-defined extraction scripts corresponding to said first subset of operational database products to extract, merge, transform and load said specified data from said operational databases into a multidimensional database.

2. The system of claim 1, wherein said extraction scripts identify fields and tables where said data is stored in said operational database products and the extraction scripts and the database schemas are the same if they identify the same fields and tables.

3. The system of claim 2 wherein, if the pre-defined extraction scripts and the database schemas are not the same, the extraction script is modified to identify the same fields and tables as the database schema, and all data from said operational databases is extracted, merged, transformed and loaded into the multidimensional database.

4. The system of claim 3 further comprising a system configuration utility providing an interface for modifying said extraction scripts and said extraction management script.

5. The system of claim 4 wherein, if the pre-defined extraction scripts and the database schemas are not the same, the system configuration utility creates a new extraction script and presents a user the interface to select the fields and tables to extract.

6. The system of claim 5 further comprising an extraction script repository, wherein the extraction script that is replaced by the new extraction script is maintained in the extraction script repository.

7. The system of claim 5 wherein the extraction management script is updated with the new extraction script.

8. The system of claim 2, wherein said data store further includes an extraction management script identifying said second subset of said extraction scripts for execution, and subroutines for execution to ensure that the appropriate tables and fields are present or created in the multidimensional database, by the data warehouse server.

9. A method for providing a system for aggregating data from a plurality of operational databases via a data warehouse server, comprising:
    providing a collection of pre-defined extraction scripts, each of said pre-defined extraction scripts identifying data available for extraction from a separate one of a plurality of operational database products, said extraction scripts including parameters for specifying which of said data to extract;
    retrieving a database schema from each of plurality of operational database products and, if the pre-defined extraction scripts and the database schemas are the same;
    executing a first subset of said pre-defined extraction scripts corresponding to a second subset of said operational database products, said second subset of said operational database products corresponding to a set of operational databases coupled to a data warehouse server, to extract, merge, transform and load said specified data from said operational databases into a multidimensional database.

10. The method of claim 9, further comprising:
    identifying, in said extraction scripts, where said data is stored in said operational database products.

11. The method of claim 9, further comprising:
    providing an extraction management script identifying said first subset of said extraction scripts for execution.

12. The method of claim 11, wherein said extraction management script identifies said second subset of said extraction scripts using parameters.

13. The method of claim 11, wherein said extraction management script includes address information for identifying the location of said operational databases.

14. The method of claim 11, wherein said extraction management script includes login credentials for connecting to said operational databases.

15. The method of claim 9, further comprising:
    providing an interface for modifying said extraction scripts and said extraction management script.

16. A system for aggregating data from a plurality of operational databases, comprising:
    a data store storing a collection of pre-defined scripts identifying configuration information for said system, each of said scripts corresponding to one of a plurality of operational database products, said scripts including parameters for modifying said configuration information; and
    a data warehouse server coupled to a set of operational databases corresponding to a first subset of said operational database products, said data warehouse server retrieving a database schema from each of the operational databases in the first subset of operational database products and, if the pre-defined extraction scripts and the database schemas are the same, executing a second subset of said scripts corresponding to said first subset of said operational database products to extract, merge, transform and load data from said operational databases in accordance with said configuration information to generate a multidimensional database.

17. The system of claim 16, wherein said configuration information includes extraction information identifying data to be extracted and its location in said operational databases, merge information specifying merges to be performed on said extracted data, transformation information specifying transformations to be performed on said extracted data, and loading information specifying how said transformed data is to be loaded.

18. The system of claim 17, wherein said scripts comprise:
    at least one extraction script specifying said extraction information; and
    at least one transformation script specifying said merge information, said transformation information and said loading information.

19. The system of claim 18, wherein said at least one extraction script is XML-based.

20. The system of claim 18, wherein said merge information in said at least one transformation script specifies an order in which said data extracted from said operational databases is merged.

21. The system of claim 20, wherein said at least one transformation script is an SSIS script.

22. The system of claim 18, further comprising:
an extraction management script identifying a third subset of said extraction scripts for execution, said third subset of said extraction scripts corresponding to said first subset of said operational database products.

23. The system of claim 22, wherein said extraction management script includes address information for identifying the location of said operational databases.

24. The system of claim 22, wherein said extraction management script includes login credentials for connecting to said operational databases.

25. The system of claim 16, further comprising:
a system configuration utility providing an interface for modifying said parameters in said scripts.

26. A method for aggregating data from a plurality of operational databases via a data warehouse server, comprising:
providing a collection of pre-defined scripts identifying configuration information for said system, each of said pre-defined scripts corresponding to one of a plurality of operational database products, said scripts including parameters for modifying said configuration information;
retrieving a database schema from each of plurality of operational database products;
and, if the pre-defined extraction scripts and the database schemas are the same, then executing a first subset of said scripts corresponding to a second subset of said operational database products, said second subset of said operational database products corresponding to a set of operational databases coupled to a data warehouse server, to extract, merge, transform and load data from said operational databases in accordance with said configuration information to generate a multidimensional database.

27. The system of claim 26, wherein said configuration information includes extraction information identifying data to be extracted and its location in said operational database products, merge information specifying merges to be performed on said extracted data, transformation information specifying transformations to be performed on said extracted data, and loading information specifying how the transformation data is to be loaded.

28. The method of claim 27, wherein said providing comprises:
providing at least one extraction script specifying said extraction information; and
providing at least one transformation script specifying said transformation information.

29. The method of claim 28, further comprising:
providing at least one extraction management script identifying a third subset of said extraction scripts for execution, said third subset of said extraction scripts corresponding to said second subset of said operational database products.

30. The method of claim 27, further comprising:
providing an interface for viewing and modifying said extraction, merge, transformation and loading information in said scripts.

* * * * *